United States Patent [19]

Okamura et al.

[11] Patent Number: 5,043,837
[45] Date of Patent: Aug. 27, 1991

[54] ALIGNMENT DISK FOR MAGNETIC HEAD AZIMUTH CORRECTION

[75] Inventors: Hiroshi Okamura; Shouji Nakajima; Chikahisa Kawakami, all of Tokyo, Japan

[73] Assignee: Kabushiki Kaisha Toshiba, Kanagawa, Japan

[21] Appl. No.: 567,701

[22] Filed: Aug. 15, 1990

Related U.S. Application Data

[63] Continuation of Ser. No. 404,067, Sep. 7, 1989, abandoned, which is a continuation of Ser. No. 113,202, Oct. 27, 1987, abandoned.

[30] Foreign Application Priority Data

Oct. 31, 1986 [JP] Japan .................................. 61-260047
Dec. 25, 1986 [JP] Japan .................................. 61-307666

[51] Int. Cl.$^5$ .......................... G11B 5/56; G11B 5/455
[52] U.S. Cl. .................................. 360/135.0; 360/76.0
[58] Field of Search .................. 360/76, 31, 135, 109; 324/210, 212

[56] References Cited

U.S. PATENT DOCUMENTS

| | | | |
|---|---|---|---|
| 4,097,908 | 6/1978 | Chou et al. | 360/76 |
| 4,513,331 | 4/1985 | Baker et al. | 360/75 |
| 4,694,359 | 9/1987 | Oya | 360/76 |

FOREIGN PATENT DOCUMENTS

| | | | |
|---|---|---|---|
| 60-50713 | 3/1985 | Japan | 360/76 |
| 60-212806 | 10/1985 | Japan | 360/76 |

OTHER PUBLICATIONS

IBM TDB vol. 20, No. 5, "Read/Write Magnetic Azimuth Adjustment Method" Hart et al., 10/77, pp. 1897-1901.
Japanese Patent Application Laying Open Official Gazette No. 60-50713 by Toshiba (Fujiki) Mar. 20, 1985 Azimuth Correcting Method.
"Barrium Ferrite Perpendicular Recording Floppy Disk," Toshiba Review No. 154, pp. 18-22, Winter 1985, Imanura et al.
"Alignment Disk For High Density Floppy Disk Drive," Great Meeting of Denki Tsushin Gakkai in 1986 1-180.

Primary Examiner—Vincent P. Canney
Assistant Examiner—Steven R. Garland
Attorney, Agent, or Firm—Finnegan, Henderson, Farabow, Garrett and Dunner

[57] ABSTRACT

An azimuth adjustment disk having first and second areas alternately recorded in a circumfrential direction. Each of the first areas has two azimuth burst signal. The two azimuth burst signals have different azimuths and a first signal wavelength. While each of the second areas has two azimuth burst signals with azimuths corresponding to the bursts of the first areas, but which have a longer wavelength.

2 Claims, 7 Drawing Sheets

ALIGNMENT DISK FOR MAGNETIC HEAD AZIMUTH CORRECTION

This application is a continuation of application Ser. No. 07/404,067, filed Sept. 7, 1989, now abanodoned which is a continuation of application Ser. No. 07/113,202, now abandoned filed Oct. 27, 1987, now abandoned.

The present application claims priority of Japanese Application No. 61-260047 filed on Oct. 31, 1986 and No. 61-307666 filed on Dec. 25, 1986.

FIELD OF THE INVENTION AND RELATED ART STATEMENT

This invention relates a system for compensating the azimuth of a magnetic head fixed to a carriage during an assembling process of a floppy disk apparatus and, more particularly, to an alignment disk used in the system.

Generally, in a floppy disk apparatus manufactured as a commercial product, it is necessary to unify the angle of a read/write gap of the magnetic head relative to the tracks in order to read out effectively and without fail any data written in the floppy disk by another floppy disk recording apparatus.

When there is a difference between the read/write gap angles of one apparatus and another, a large angle is formed between the directions of the magnetized patters recorded on a floppy disk by one apparatus and the read/write gap of another apparatus.

This angle is called azimuth, and some decrease, in output of the magnetic head owing to the azimuth is called azimuth loss. The larger the width of tracks (that is, the lower the track density) and the read out wavelength of the magnetic pattern (that is, the higher the line density), the larger the azimuth loss becomes. When the angles of the read/write gaps of one floppy disk apparatus and another are unified, it is known that it is possible to delete any azimuth loss.

In the conventional floppy disk apparatus, as shown in FIG. 8, one magnetic head 10 is mounted on a carriage 12, directly or through a gimbal plate, so as to linearly move along the diameter of the disk 11 for one side of a magnetic disk 11. The carriage 12 supports the magnetic head on the face side (side "0") and another magnetic head (not shown) on the reverse side (side "1").

The carriage 12 is movably mounted on a main rail 13 and sub rail 14, 16, and various slide bearings 15 through 17. The carriage 12 linearly moves along the diameter direction of the disk 11 being guided by the main rail and subrail above.

The disk 11 rotates at a high speed with a spindle shaft 18 of a spindle motor.

Each magnetic head seeks for a data track defined on the disk 11 by the seeking motion of the carriage 12. Then, the disk apparatus carries out its data read/write function for the data track with the read/write gap of each head, which moves with respect to the track of the disc 11. The gap at the "side 0" of the carriage is shown by a reference numeral 19 in FIG. 8. When the extended line "b" of a longitudinal line of the read/write gap 19 formed on the magnetic head 10 is parallel to a straight line "a" which is parallel to the straight line passing through the spindle shaft 18 and along which the carriage 12 moves, as shown in FIG. 9, no azimuth loss mentioned above is created.

However, it is so difficult practically to fix the magnetic head on the carriage so that the extended line "b" can be made parallel to the straight line "a". Frequently, the magnetic head 10 is mounted or fixed on the carriage 12 so as to have some degree of angle, for example, $\theta_1$, or $\theta_2$, as shown in FIGS. 10 and 11. When data are written on a magnetic disk by the magnetic head 10 having the angle $\theta_1$ or $\theta_2$, an azimuth loss will be created during reading out of data from such disk by another disk apparatus.

For example, when data is read out from the disc 11, on which the data is recorded by means of the magnetic head 10 having an angle $\theta_1$ as shown in FIG. 10, by a using another magnetic head 10 provided with another angle $\theta_2$, as shown in FIG. 11, an azimuth of $[\theta_1 + \theta_2]$ is generated between the gap 19 of the magnetic head 10 and the track of the disk 11. This is a very large azimuth loss. In order to decrease as far as possible the azimuth loss, it is necessary to mount the magnetic head on the carriage carefully and precisely during the assembling process for the floppy disk apparatus so as to make the angle $\theta_1$ or $\theta_2$ as small as possible. This technical purpose in manufacturing of the floppy disc apparatus can be attained without so much difficulty for a magnetic head mounted on a head arm, since the arm is fixed on the carriage 12 with screws. However, since the carriage is secured by guide rails 13 and 14, it is very difficult to correct the wrong position of the magnetic head mounted on the carriage.

According to the manufacturing process of the conventional floppy disk apparatus, a test disk called "an alignment disk" is used to detect the azimuth of magnetic heads.

A conventional alignment disk has portions where data are recorded with the azimuth burst $+\theta$ (a magnetized pattern recorded so as to incline for example, to the right relative to the tracking direction) and other portions where data are recorded with an azimuth burst $-\theta$ (another magnetized pattern recorded so as to incline, for example, to the left relative to the tracking direction) in a data track. Both the $+\theta$ and $-\theta$ azimuth burst portions are written alternately on the whole track, as shown in FIG. 12 and have the same length. The spaces between each $+\theta$ azimuth burst portion and each $-\theta$ azimuth portion are erased by a DC current.

FIG. 13 shows output wave forms reproduced from the azimuth bursts written on the alignment disk mentioned above, with the magnetic head.

As apparent from the drawing of FIG. 13, reading out of the portion of the azimuth burst recorded on the alignment disk by a magnetic head generates several groups of sine waves generated intermittently.

Since the spaces between adjacent azimuth burst regions on the alignment disk are DC erased, no output is obtained from the spaces. The outputs generated from the azimuth bursts $+\theta$ and $-\theta$ indicate a degree of discrepancy between the direction of magnetization of respective azimuth bursts and the direction of the read/write gap length.

The amplitude output corresponding to the azimuth burst $+\theta$ is equal to that corresponding to the other azimuth burst $-\theta$ when there is no angle between the radial direction of the alignment disk and the longitudinal direction of the read/write gap. However on the contrary, when the longitudinal direction of the read/write gap inclines relative to the radial direction of the alignment disk, the particular output corresponding to the azimuth burst inclining in the same direction as the read/write gap is made larger than output corresponding to the other azimuth burst.

Accordingly, the azimuth of the magnetic head can be determined or corrected so as to make the amplitude of the outputs from both the azimuth bursts $+\theta$ and $-\theta$ equal.

The precision of correction of azimuth with reference to the magnetic head is determined by the detection sensibility of the azimuth loss, so that if the wavelength of a signal recorded as the azimuth burst is made short, the detection sensibility of the azimuth loss rises and also correction precision rises.

FIG. 14 is a characteristic curve showing the azimuth loss resulting from the output decline of the magnetic head. Under the existence of azimuth $\theta_A$, the output $V(\theta)$ of the magnetic head can be shown by the following formula, $$V(\theta) = V_0 \cdot \mathrm{Sin}[(\pi T_W/\lambda) \mathrm{Tan} |\theta_A|]/[(\pi T_W/\lambda) \mathrm{Tan} |\theta_A|]$$
$$\approx V_0 \cdot \mathrm{Sin}[(\pi T_W/\lambda) |\theta_A|]/[(\pi T_W/\lambda) |\theta_A|]$$

(wherein, $T_W$ is a track width, $\lambda$ is a wavelength of the magnetized pattern, and $V_0$ is an output of the magnetic head under no existence of the azimuth $\theta_A$).

However, when the wavelength of the azimuth burst is made short, if the fixing angle of the magnetic head to the carriage is largely shifted, the azimuth loss, is made very large and amplitude of output signals corresponding to the azimuth burst is made too small to detect the azimuth of the magnetic head.

In short, the conventional alignment disk has a problem, in that rough correction of the azimuth of the magnetic head in the case where the alignment is large, and fine correction of the azimuth of the magnetic, head in the case of where the azimuth is very small cannot be carried out with one alignment disk.

OBJECT AND SUMMARY OF THE INVENTION

It is an object of the present invention to make azimuth correction of a magnetic head (in particular, at the "side 0") fixed to the main body of a carriage easy and of high precision, which correction is done in the manufacturing process of the floppy disk apparatus, resulting in a small azimuth loss attained during the data reading out time.

It is another object of the present invention to make possible the correction at the same time of one magnetic head having a fixing angle which has been shifted a large amount as well as the correction of the other magnetic head fixed to the same carriage, which has been shifted only a small amount.

The system of the present invention has a position correction mechanism for correcting the relative position between the carriage and the spindle mechanism. The position correction mechanism functions, for example, by finely moving the main rail for guiding the linear movement of the carriage or by having the rotation center of the spindle mechanism placed on the extended line of a longitudinal direction of the read/write gap formed on the magnetic head at its "side 0".

According to the system of the present invention, a special alignment disk is used. On the alignment disk, magnetized patterns of a predetermined length and having different recording azimuths are recorded along the tracking direction and in the particular or corresponding track regions. The magnetized patterns are adapted to be read out with at least two kinds of long waves and short waves. In order to detect the azimuth of the magnetic head, first a rough correction of the azimuth is done by reading out the magnetized pattern of long waves by means of a measurement appliance, and next a fine correction of the azimuth is carried out by reading out the other magnetized pattern having the short waves.

DETAILED DESCRIPTION OF PREFERRED EMBODIMENT

The preferred embodiment of the present invention will be described with reference to a set of drawings, in detail.

Figure 1:
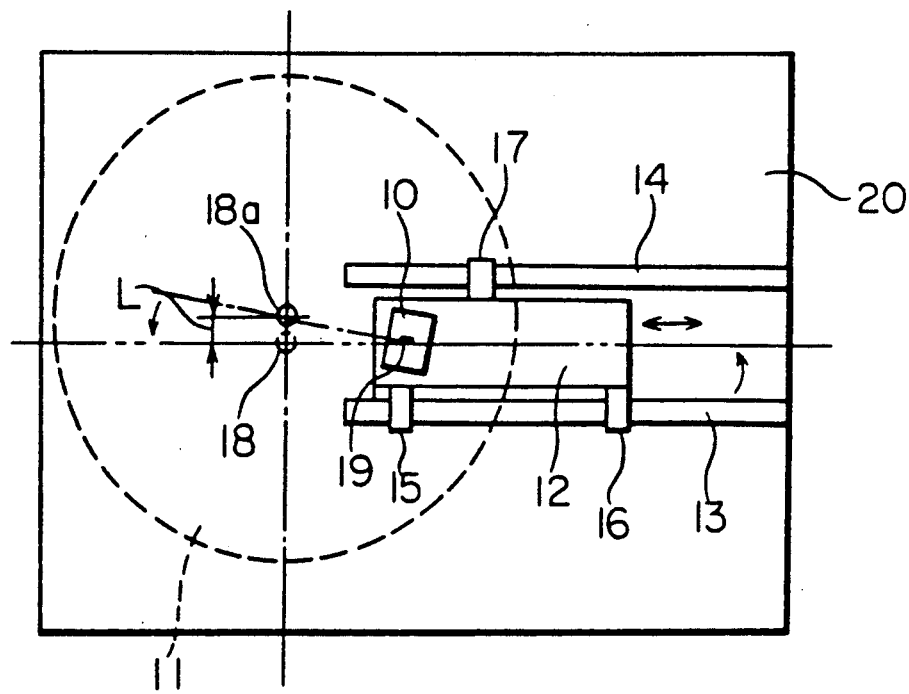
FIG. 1 is a plan view showing a construction of the carriage mechanism according to an embodiment of the system of the present invention.
Figure 8:
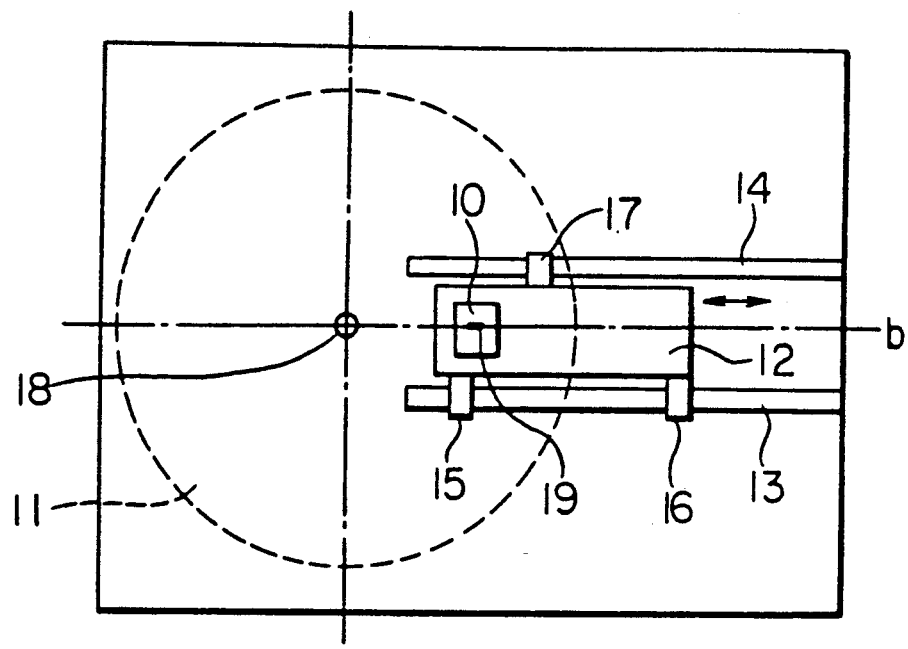
FIG. 8 is a plan view depicting a construction of the carriage mechanism of the floppy disk apparatus according to the conventional technique.
Figure 9:
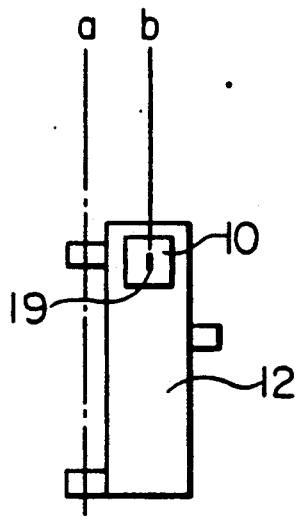
FIGS. 9 through 11 are plan views respectively explaining the azimuth of the magnetic head in the conventional floppy disk apparatus.
Figure 10:
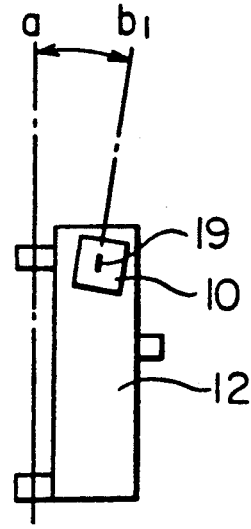
Figure 11:
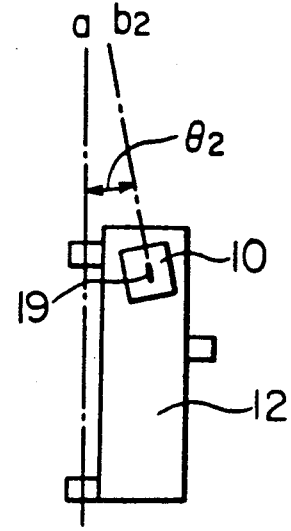
Figure 12:
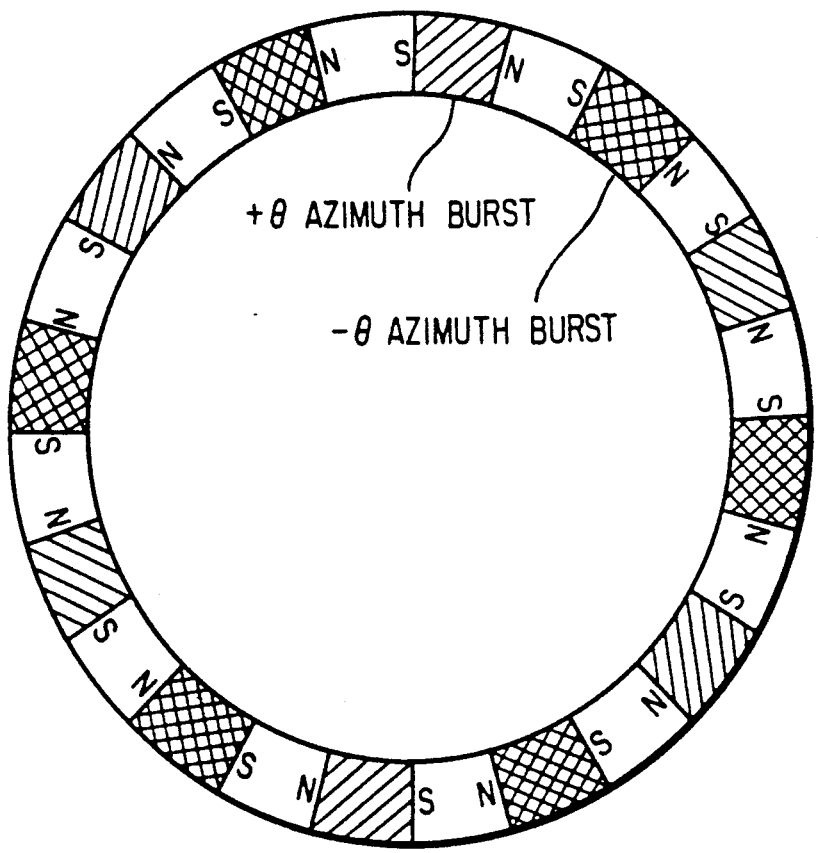
FIG. 12 is a diagrammatical view showing the data recording condition on the conventional alignment disk.
Figure 13:
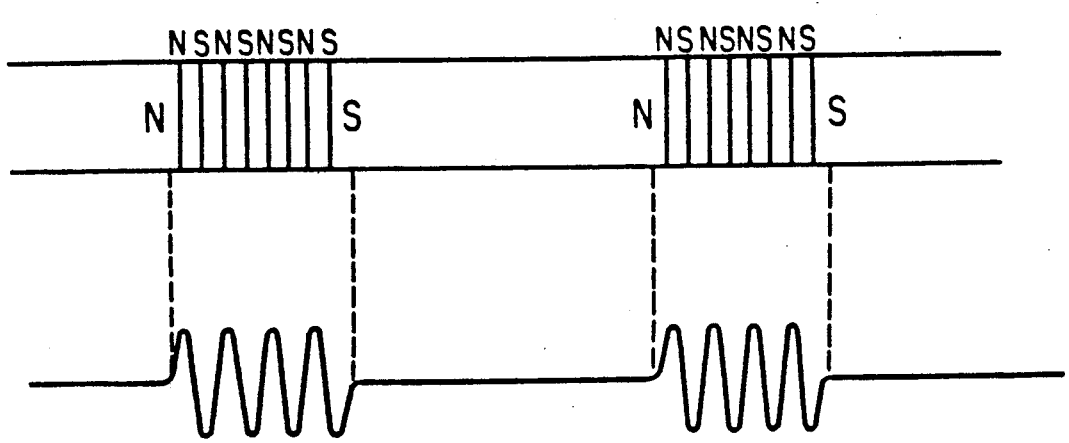
FIG. 13 is a diagram depicting the differences between the wave forms read out from the magnetized patterns the conventional alignment disk and the magnetic head.
Figure 14:
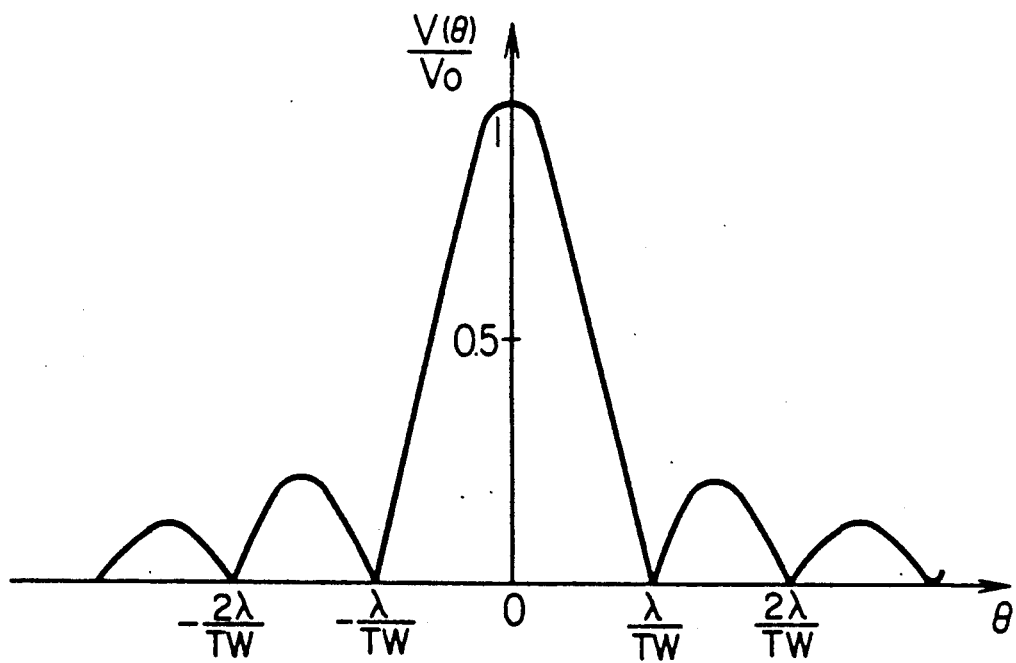
FIG. 14 is a diagram depicting the relation between a read out signal from the magnetic disk and an azimuth in the conventional floppy disk apparatus.

FIG. 1 is a plan view showing a construction of the carriage mechanism in the embodiment of the system according to the present invention. FIG. 1 is similar to FIG. 8 and contains common members with that of FIG. 8.

As shown in this figure, the carriage 12 is placed so that the center line of the carriage 12 passes through the center point of the spindle shaft 18, and the carriage moves along a radial direction of the disk 11 in a linear manner. The carriage 12 is held in place by slide guide members 15 and 16 each having a through hole, and a U-shaped guide member 17 having slide bearings. A main rail 13 passes through the set of the guide members 15 and 16 and a sub rail 14 passes through the U-shaped guide member 17 to be held by the sliding bearings on two arms of the U-shaped member 17.

The disk 11 rotates with the spindle shaft 18 fixed to a rotor of a spindle motor. The spindle motor (not shown), the main rail 13 and sub rail 14, respectively are secured to a frame 20 of the floppy disk apparatus.

A magnetic head 10 is mounted on the carriage 12 at "side 0" of the magnetic disk 11. The carriage 12 shifts along the rails 13 and 14 for seeking one of recording tracks defined on the rotating disc 11. The carriage 12 supports a head arm (not shown) so that the head arm moves towards and away from the disk. The head arm support another magnetic head (not shown) for the other side ("side 1") of the disk 11.

Figure 2:
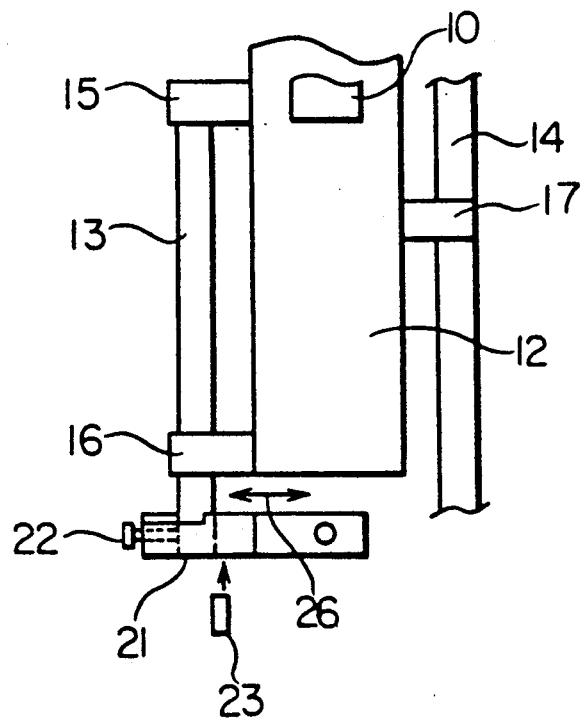
FIG. 2 is a plan view depicting a construction of the azimuth correction mechanism employed in the system of the embodiment above.
Figure 3:
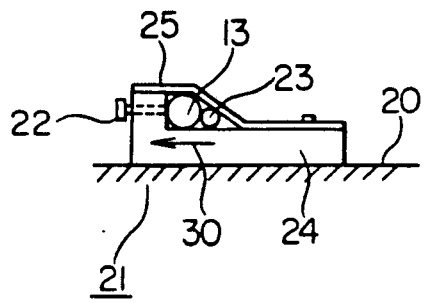
FIG. 3 is a side view of the azimuth correction mechanism shown in FIG. 2.

The azimuth correction mechanism in the embodiment of the system according to the present invention includes, as shown in FIG. 2, a fixing member 21 for fixing one end of the main rail 13, a position correction screw 22, and a spacer 23. As shown in FIG. 3, the fixing member 21 has a base 24 applied to the frame 20 and a leaf spring presser member 25 fixed to the base 24 by means of a screw. The presser member 25 biases the rail 13 against, the base 24. The position correction screw 22 is adapted to fit a threaded portion formed at a side of the base 24 and the end of the screw 22 pushes one end of the main rail 13. The position correction screw 22 functions to finely move the main rail 13 along the direction 26 perpendicular to the moving direction of the carriage 12. Another fixing member having a similar structure to the fixing member 21 is fixed on the base 24 for supporting the other end of the main rail 13.

In the system according to the present invention, the carriage 12 supporting the magnetic head 10 at the "side 0" moves linearly along the radius of the disk 11, being guided by the main rail 13 and the subrail 14.

Next, an alignment disk 11 is set on the spindle mechanism so as to rotate with the spindle shaft 18. The carriage 12 moves along radial direction of the alignment disk 11 and the magnetic head 10 reads out azimuth burst data recorded on one end of the predetermined tracks (the track at the inner circle) on the alignment disk 11. The azimuth burst data are used for determining the particular azimuth of the head, that is, the angle between the radius of the alignment disk and a longitudinally expanded line of the gap 19 of the head 10.

When the magnetic head 10 has any azimuth, the longitudinally extended line of the read/write gap 19 of the magnetic head 10 does not pass through the center of the spindle shaft 18. In order to correct or compensate the azimuth of the magnetic head 10, the carriage 12 is finely moved along the direction perpendicular to the moving direction of the carriage 12.

As shown in FIG. 3, in order to correct or compensate for the azimuth of the magnetic head 10, the position correction screw 22 is adjusted to finely move one of the ends of the main rail 13 along the direction 30.

An end of the main rail 13, which is fixed by the presser member 25 and the position correction screw 22, is moved little by little after, for example, the position correction screw 22 is loosened. Then, a spacer 23 is inserted into a gap between the presser member 25 and the base 24 to fix firmly one of the ends of the main rail 13. On the other hand, the other end of the main rail 13 is fixed by a fixing member having a similar structure to the fixing member 21.

As a result, the main rail 13 is moved little by little around the fixed end of the main rail along the direction 30.

Although the sub rail 14 is fixed, the carriage 12 can move a little along a direction of movement of the main rail 13 because the guide member 17 has a U-shape. The fine movement of the main rail 13 finely moves the main body of the carriage 12 along the same direction as that of the main rail 13, so that the read/write gap 19 of the magnetic head 10 is moved relative to the spindle shaft 18. In order to move one of the ends of the main rail 13 a little in the opposite (right) direction along the direction 26, the position correction screw 22 is screwed in. Consequently, the carriage 12 and the magnetic head 10 thereon is moved a little to the right direction along the direction 30 shown in FIG. 3.

As mentioned above, a fine movement of any one of the ends of the main rail 13 can move the read/write gap 19 of the magnetic head 10 mounted on the carriage 12.

Position correction signals output from the alignment disc 11 are input into a measurement appliance to monitor the condition of the azimuth, and the azimuth of the magnetic head 10 is corrected so the longitudinally extended line of the read/write gap 19 passes through the center of the spindle shaft 18.

As a result, if the magnetic head 10 at the "side 0" of the main body of the carriage 12 is placed or fixed with some degree of azimuth, the azimuth is corrected or compensated easily and precisely by the process mentioned above.

Although the embodiment of the system described above has an azimuth correction mechanism, in which one of the ends of the main rail 13 is finely moved, it is apparent that the present invention is not limited to the embodiment above. According to another embodiment, another mechanism including the fixing member 21 and the position correction screw 22 is applied to the other end of the main rail 13, together with the previous one applied to one end of the main rail 13, in order to move the main rail 13 in parallel.

It is possible to move the spindle shaft 18 while the carriage 12 is fixed. For example, an oval opening is formed on the frame 20 and a screw is passed through the oval opening to secure the spindle motor. On the this mechanism, the spindle motor can be finely moved along the oval opening and fixed by fastening the screw.

The alignment disk 11 used in the system according to the present invention will be described in detail with reference to the drawings.

Figure 4:
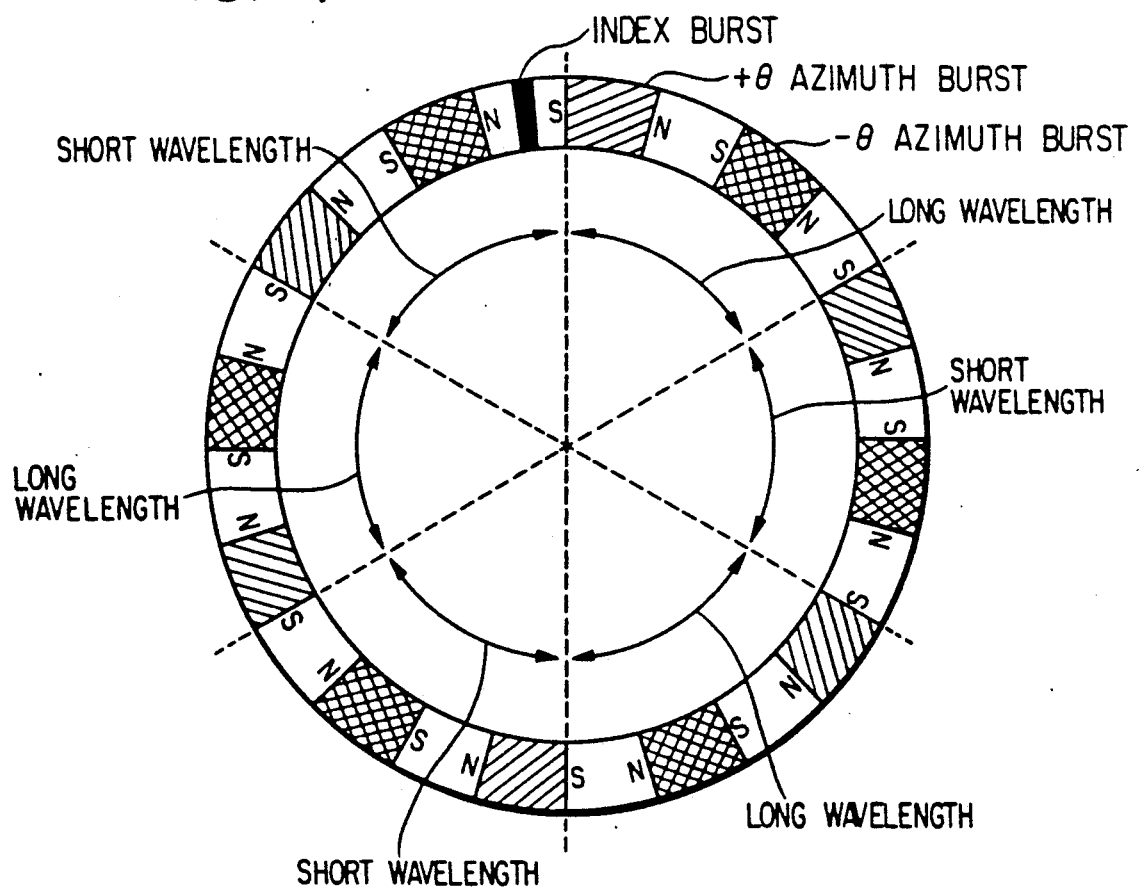
FIG. 4 is a diagram showing the recording condition of the magnetized pattern recorded on an alignment disk according to an embodiment of the present invention.

As shown in FIG. 4, azimuth burst signals of long wave and other azimuth burst signals of short wave are written on track regions of 60° of inner angle, alternately. The frequency of the read-out signal for the azimuth bursts is set to 500 KHz.

In respective track regions of the alignment disk 11, an azimuth burst region where signals are recorded with a head of azimuth $+\theta$ and an azimuth burst region where signals are recorded with a head of azimuth $-\theta$ are disposed alternately and the track regions between both the $+\theta$ and $-\theta$ azimuth burst regions are erased by DC.

As shown in FIG. 4, in one of the erased region between the azimuth burst $+\theta$ and the azimuth burst $-\theta$, an index burst signal (INDEX) of long wave is written.

Figure 5:
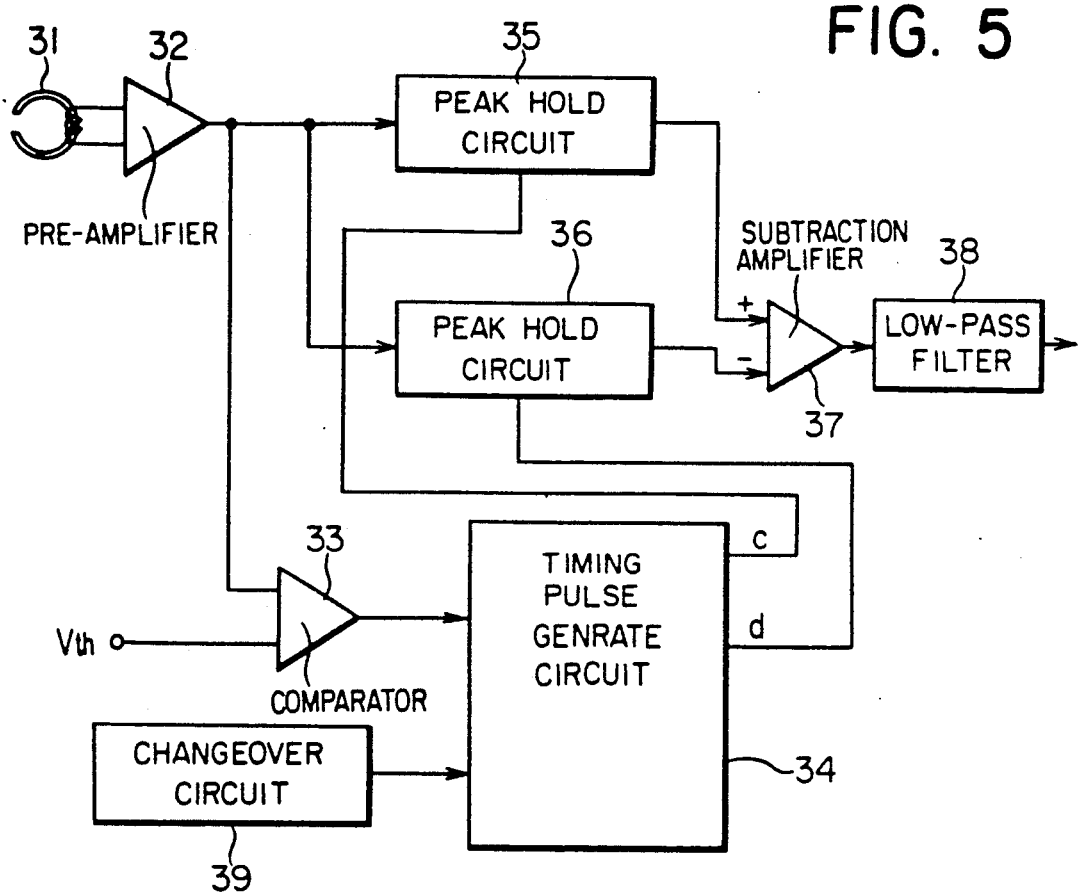
FIG. 5 is a block diagram showing a construction of a measurement appliance used to detect the azimuth by means of the alignment disk.

FIG. 5 shows a block diagram of the circuit of the measurement appliance for the alignment disk of the present invention for measuring the azimuth of the magnetic head. The measurement appliance is called an azimuth measuring apparatus.

In FIG. 5, the azimuth of the magnetic head is to be corrected by means of the azimuth correction apparatus according to the present invention. A pre-amplifier 32 amplifies signals read from the alignment disk by the magnetic head 31. A comparator 33 compares an output signal "a" of the pre-amplifier 32 and a threshold voltage $V_{Th}$ and generates an output signal "b" when the output signal "a" is higher than the threshold voltage $V_{Th}$. A timing pulse generate circuit 34 generates timing pulses "c" and "d" according to the output signal "b" of the comparator necessary to hold a peak level of the signals read from the azimuth burst track regions. A peak level holding circuit 35 holds the peak level of the output signal read from the $+\theta$ azimuth burst track regions according to the timing pulses "c". A peak level holding circuit 36 holds the peak level of the output signal read from the $-\theta$ azimuth burst regions according to the timing pulses "d". A subtraction amplifier 37 subtracts the outputs of both the peak holding circuits 35 and 36. A low pass filter 38 (hereinafter referred to as LPF) averages the output of the subtraction amplifier 37 with relation to the whole track around the periphery of the alignment disk 11. A changeover circuit 39 will be explained hereinafter.

The measuring method of the azimuth of the magnetic head by means of the alignment disk and the azimuth measuring apparatus, respectively mentioned above, will be described.

First, the magnetic head 31 reads out respective azimuth burst data on the alignment disk 11 and generates azimuth burst signals corresponding thereto. The azimuth burst signals are amplified by the pre-amplifier 32.

The wave form of the output signal "a" of the pre-amplifier 32 is shown in FIG. 6(a). The amplitude of output signals corresponding to the INDEX burst is large enough despite azimuth loss, even though the burst INDEX is read out through a magnetic head having an azimuth shifted largely (more than about 30 minutes), because the INDEX burst is written with a wave of long length.

The threshold voltage $V_{Th}$ is set so as to become smaller than the output signal "a" of the pre-amplifier 32, which signal corresponds to the index burst INDEX, and larger than the amplitude of azimuth burst signals mentioned below.

Next, the read out signals of the $+\theta$ azimuth burst regions and the $-\theta$ azimuth burst regions are obtained. The output signal "a" of the pre-amplifier 32 obtained at the time is compared with the threshold voltage $V_{Th}$ in the comparator 33.

Figure 6:
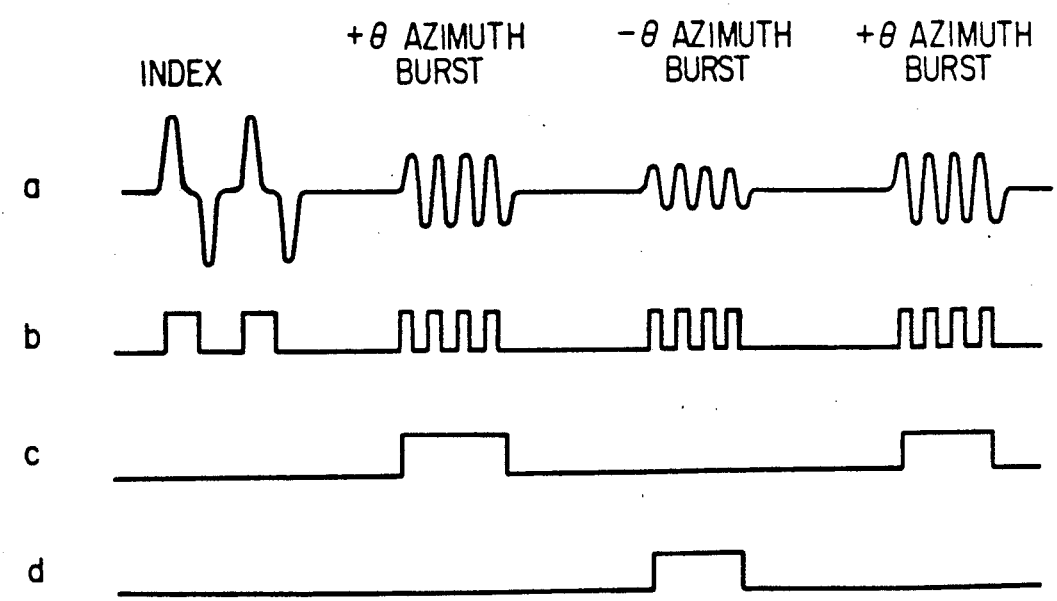
FIG. 6 is a diagram showing various wave forms of signals in the measurement appliance.

The output signal "b" of the comparator 33 rises, as shown in FIG. 6, at the portion of the index burst INDEX.

The timing pulse generating circuit 34 issues timing pulses, which are issued on the basis of the pulses corresponding to the index burst INDEX, to hold the peak level of the output signal "a" of the pre-amplifier 32, which corresponds to the $-\theta$ azimuth burst data and the other $-\theta$ azimuth data, respectively, as shown by "c" and "d" in FIG. 6.

Figure 7:
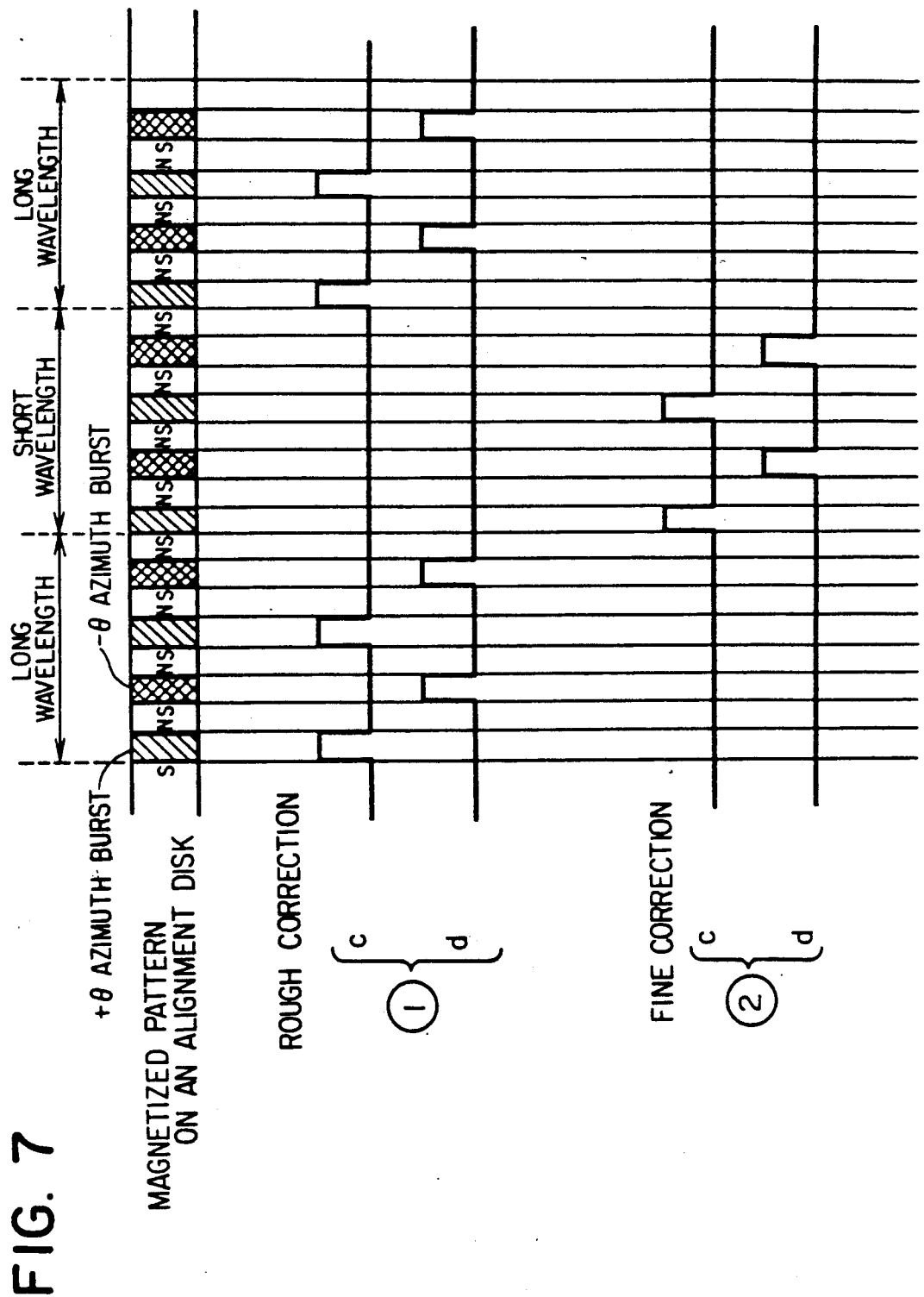
FIG. 7 is a diagram showing the relationship between the magnetized pattern recorded on the alignment disk and timing pulse in the measurement appliance.

When the timing pulse generating circuit 34 uses the output signal "e" from the changeover circuit 39 to compensate or correct, the magnetic head as a previous step, which head has a fixing angle shifted greatly, or to compensate or correct it roughly, the timing pulse is made to hold the peak level of the output signal "a" from the pre-amplifier 32, as shown at ① "c" and "d" in FIG. 7.

When the other magnetic head having a fixing angle shifted a little (less than 1 degree or 1 minute) is corrected, another timing pulse is made to hold the peak level of the output signal "a" from the pre-amplifier 32, as shown at ② "c" and "d" in FIG. 7.

According to either one of the two shapes of timing pulse in FIG. 7, the peak hold circuit 35 holds the peak level of the output signal "a" of the pure-amplifier 32, which corresponds to the $+\theta$ azimuth data or another peak hold circuit 36 holds the peak level of the output signal "a" of pre-amplifier 32, which corresponds to the $-\theta$ azimuth data.

Both the held values are subtracted in the subtraction amplifier 37. The subtracted values are averaged during one rotation of the alignment disk 11 through the LPF 38 and output as an azimuth information from the magnetic head.

In case the alignment disk according to the present invention is used to do rough correction of azimuths of the magnetic head, it is preferable to do the azimuth correction after against burst signal read from the azimuth burst track regions of long wavelength is effectuated by the changeover circuit 39. In case the azimuth is fine corrected, azimuth burst signals corresponding to an azimuth burst of short wavelength are effectuated by the changeover circuit 39 to carry out a precise azimuth correction.

As mentioned above, only one alignment disk according to a present invention is sufficient to correct the magnetic head having a fixing angle shifted by a very large amount, as well as another magnetic head having another fixing angle shifted by only a small amount.

In the alignment disk according to the present invention, the frequency of the azimuth burst data of long wavelength is 125 KHz and the other frequency of the azimuth burst data of short wavelength is 500 KHz.

In the alignment disk 11 according to the present invention, the azimuth burst data of long wave and the other azimuth burst data of short wave are written in alternately arranged track regions of inner angle 60° of the disk. However, the track regions can be formed by evenly dividing the whole periphery of the alignment disk and, as a result, track regions of another inner angle other than 60° can be alternately arranged around the whole periphery of the disk. In the alignment disk 11, a plurality of tracks, against which burst data are disposed on the alignment disk, for example recorded, are concentrically on an innermost portion thereof and an outermost portion thereof for compensating for azimuth of the head in the innermost and outermost portions.

Furthermore, in the alignment disk according to the present invention, the azimuth burst is divided into two types, long wave and short wave. However, the azimuth burst can be divided into any number of types. For example, the wavelength of the azimuth burst may be divided into several kinds of respective track regions so as to do the correction of the fixing angle of the magnetic head in several steps.

As mentioned above in detail, in accordance with the present invention, the relative position of the read/write gap of the magnetic head fixed on the main body of the carriage at its "side 0" to the spindle shaft can be compensated without difficulty, and more precisely during assembly of the magnetic head. Thus, the azimuth of the magnetic head secured at the "side 0" of the carriage maybe corrected easily and finely.

Using the alignment disk of the present invention, in the detection of the fixing angle of magnetic heads, first a magnetized pattern of long wave of the magnetic head is read out to roughly correct the azimuth and next another magnetized pattern of short wave of the magnetic head is read out to finely correct the azimuth. Consequently, it is apparent that the magnetic head having its fixing angle considerably shifted, as well as other magnetic heads having a fixing angle shifted a only little can be corrected effectively by means of the system of the present invention.

Although only one embodiment of the invention has been disclosed and described, it is apparent that other embodiments and modifications of the invention are possible.

What is claimed is:

1. An alignment disk for aligning an azimuth of a magnetic head in a magnetic recording apparats to a predetermined direction, comprising:

a disk-shaped body having a magnetizable surface thereon, the surface including a plurality of first and second areas alternately arranged along the circumferential direction of the body;

each of the first areas having two azimuth burst signals recorded therein, each burst signal corresponding to a different azimuth and having a first signal wavelength; and each of the second areas having two azimuth burst signals recorded thereon corresponding to the same azimuths as the burst signals of the first areas and having a second signal wavelength longer than the first signal wavelength.

2. The alignment disk according to claim 1, wherein the second signal wavelength is about twice as long as the first signal wavelength.

* * * * *